United States Patent
Gevirtz (10) Patent No.: US 9,892,366 B2
(45) Date of Patent: Feb. 13, 2018

(54) FACIES DEFINITION USING UNSUPERVISED CLASSIFICATION PROCEDURES

(71) Applicant: Landmark Graphics Corporation, Houston, TX (US)

(72) Inventor: Joel Leo Gevirtz, Houston, TX (US)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 0 days.

(21) Appl. No.: 14/768,188

(22) PCT Filed: Feb. 28, 2014

(86) PCT No.: PCT/US2014/019570
§ 371 (c)(1),
(2) Date: Aug. 14, 2015

(87) PCT Pub. No.: WO2015/130313
PCT Pub. Date: Sep. 3, 2015

(65) Prior Publication Data
US 2016/0364654 A1    Dec. 15, 2016

(51) Int. Cl.
*G06N 99/00* (2010.01)
*E21B 47/00* (2012.01)
(Continued)

(52) U.S. Cl.
CPC ........... *G06N 99/005* (2013.01); *E21B 47/00* (2013.01); *E21B 49/00* (2013.01); *G01V 99/005* (2013.01);
(Continued)

(58) Field of Classification Search
None
See application file for complete search history.

(56) References Cited

U.S. PATENT DOCUMENTS

| 7,054,753 B1 * | 5/2006 | Williams | G01V 1/32 |
| | | | 702/13 |
| 2004/0133531 A1 * | 7/2004 | Chen | G06K 9/6298 |
| | | | 706/8 |

(Continued)

OTHER PUBLICATIONS

John, et al., "Seismic Facies Identification and Classification Using Simple Statistics," in Proceedings of the 2005 SPE Annual Technical Conference and Exhibition held in Dallas, Texas, U.S.A., Oct. 9-12, 2005.*

(Continued)

*Primary Examiner* — Kakali Chaki
*Assistant Examiner* — Fuming Wu (57) ABSTRACT

The disclosed embodiments include a method, apparatus, and computer program product for generating facies definition. One embodiment is a computer-implemented method that includes the steps of receiving well logging data indicative of one or more properties of geologic formations penetrated by one or more wellbores, wherein no assumptions are being introduced to the well logging data; determining a type well; developing an appropriate scaling of the well logging data based on the type well; creating a training set by drawing samples from the well logging data at random depths; modifying the training set to remove interfering data; performing an unsupervised classification procedure on the training set to group samples in the training set; comparing a suite of values of the well logging data in the groups to classify lithofacies of the type well; develop classification functions; and classifying unknown wells using the classification functions to generate the facies definition.

18 Claims, 2 Drawing Sheets

(51) Int. Cl.
  *E21B 49/00* (2006.01)
  *G01V 99/00* (2009.01)
(52) U.S. Cl.
  CPC .... *G01V 2210/66* (2013.01); *G01V 2210/665* (2013.01)

(56) References Cited

U.S. PATENT DOCUMENTS

| | | | | |
|---|---|---|---|---|
| 2006/0041409 | A1* | 2/2006 | Strebelle | G01V 1/30 703/10 |
| 2007/0276604 | A1* | 11/2007 | Williams | G01V 1/50 702/16 |
| 2012/0136636 | A1* | 5/2012 | Kleine | G01V 99/005 703/2 |
| 2012/0221306 | A1* | 8/2012 | Hurley | G01V 99/005 703/6 |
| 2013/0325349 | A1 | 12/2013 | Bunting et al. | |
| 2013/0338978 | A1 | 12/2013 | Zhang et al. | |
| 2014/0207383 | A1* | 7/2014 | Embid Droz | E21B 49/00 702/13 |
| 2014/0225890 | A1* | 8/2014 | Ronot | G01V 1/282 345/420 |
| 2014/0365409 | A1* | 12/2014 | Burch | E21B 41/0092 706/12 |
| 2016/0145991 | A1* | 5/2016 | Yarus | E21B 44/00 700/275 |
| 2016/0178800 | A1* | 6/2016 | Ramsay | E21B 43/00 702/12 |
| 2016/0209546 | A1* | 7/2016 | Ramsay | G05B 17/02 |
| 2016/0231462 | A1* | 8/2016 | Ramsay | G01V 99/005 |
| 2016/0313463 | A1* | 10/2016 | Wahrmund | G01V 1/28 |
| 2016/0364654 | A1* | 12/2016 | Gevirtz | E21B 49/00 |

OTHER PUBLICATIONS

Marroquin, et al., "A visual data-mining methodology for seismic facies analysis: Part 1—Testing and comparison with other unsupervised clustering methods," Geophysics, vol. 74, No. 1, p. p1-p11, 2009.*

Marroquin, et al., "A visual data-mining methodology for seismic facies analysis: Part 2—Application to 3D seismic data," Geophysics, vol. 74, No. 1, p. p13-p23, 2009.*

Morteza et al., "Classification and identification of hydrocarbon reservoir lithofacies and their heterogeneity using seismic attributes, logs data and artificial neural networks," Journal of Petroleum science & engineering, vol. 82-83, pp. 151-165, 2012.*

International Search Report and Written Opinion, dated Nov. 27, 2014, 10 pages; Korean International Searching Authority.

Raeesi, Morteza et al., "Classification and identification of hydrocarbon reservoir lithofacies and their heterogeneity using seismic attributes, logs data and artificial neural networks." Journal of Petroleum Science and Enginrering, vol. 82-83, pp. 151-165, Feb.-Mar. 2012.

Marroquin, Ivan Dimitri et al., "A visual data-mining methodology for seismic facies analysis: Part 1—Testing and comparison with other unsupervised clustering methods," Geophysics, vol. 74, No. 1, pp. P1-P11, Jan.-Feb. 2009.

European Patent Office, Supplementary European Search Report, dated Jun. 21, 2017, 7 pages, Europe.

Salim Chikhi and Mohamed Batouche, Using Probabilistic Unsupervised Neural Method for Lithofacies Identification, Jan. 2005, 9 pages, vol. 2, The International Arab Journal of Information Technology.

Aghchelou.M, Nabi-Bidhendi M., and Shahvar M.B., Lithofacies Estimation by Multi-Resolution Graph-Based Clustering of Petrophysical Well Logs: Case Study of South Pars Gas Field of Iran, Aug. 6-8, 2012, 15 pages, SPE 162991, Society of Petroleum Engineers, 2012 SPE Nigerian Annual International Conference and Exhibition, Abuja, Nigeria.

Sang Heon Lee, Arun Kharghoria and Akhil Datta-Gupta, Electrofacies Characterization and Permeability Predictions in Complex Reservoirs, Oct. 3-6, 12 pages, Society of Petroleum Engineers, 1999 SPE Annual Technical Conference and Exhibition, Houston, TX.

J.T. Cevolani, A.E. Mostafa, E.A. Vital Brazil, L.Costa De Oliveira, L.Goliatt Da Fonseca, and M. Costa Sousa, Computational Methodology to Study Heterogeneities in Petroleum Reservoirs, Jun. 10-13, 2013, 27 pages, Society of Petroleum Engineers, EAGE Annual Conference & Exhibition incorporating SPE Europec, London.

* cited by examiner

FACIES DEFINITION USING UNSUPERVISED CLASSIFICATION PROCEDURES

CROSS-REFERENCE TO RELATED APPLICATIONS

This application is a U.S. National Stage patent application of International Patent Application No. PCT/US2014/019570, filed on Feb. 28, 2014, the benefit of which is claimed and the disclosure of which is incorporated herein by reference in its entirety.

BACKGROUND OF THE INVENTION

1. Field of the Invention

The present invention generally relates to the field of computerized reservoir modeling, and more particularly, to a system and method configured to generate facies definition using unsupervised classification procedures.

2. Discussion of the Related Art

In the oil and gas industry, reservoir modeling involves the construction of a computer model of a petroleum reservoir for the purpose of improving estimation of reserves and making decisions regarding the development of the field. The characterization of electrofacies is essential for reservoir modeling. Electrofacies is a type of facies analysis that uses log suites to determine facies or rock type. In reservoir characterization and reservoir simulation, the facies properties that are most important are the petrophysical characteristics that control the fluid behavior in the facies. Electrofacies and other multivariate techniques are often used to determine these characteristics.

However, current methods for deriving electrofacies require initial assumptions regarding the number of groups represented by the sample, an initial partition of the samples into a priori groups, and distribution properties of data (e.g., numerical range and the kind of statistical distribution that governs the range of numerical data). These conditions and assumptions are rarely met; therefore, subtle distortions are introduced to the classification that cannot be undone by post-facto analysis.

Accordingly, the disclosed embodiments seek to provide one or more solutions to the above problems associated with facies analysis.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION

The disclosed embodiments include a system, computer program product, and a computer implemented method configured to generate facies definition using an unsupervised classification procedure.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, steps, operations, elements, and/or components, but do not preclude the presence or addition of one or more other features, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described to explain the principles of the invention and the practical application, and to enable others of ordinary skill in the art to understand the invention for various embodiments with various modifications as are suited to the particular use contemplated. The scope of the claims is intended to broadly cover the disclosed embodiments and any such modification.

Figure 1:
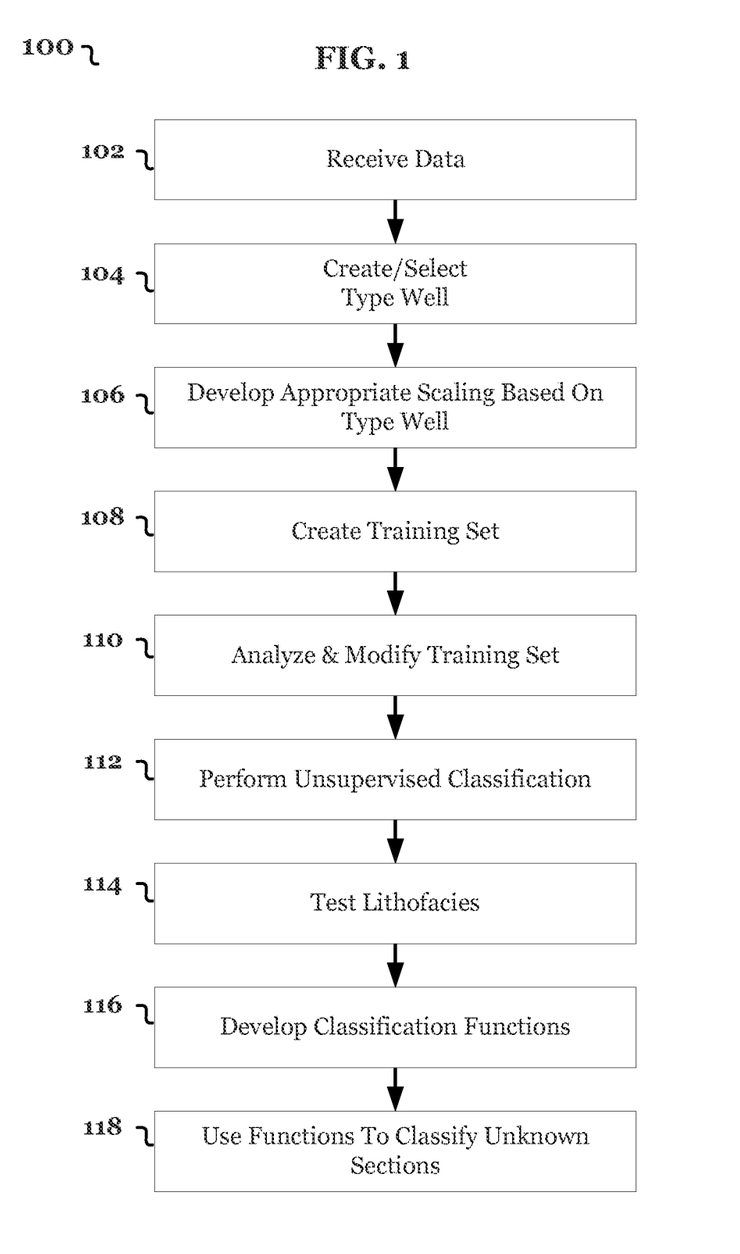
FIG. 1 is a flowchart that depicts a process configured to generate facies definition using an unsupervised classification procedure in accordance with the disclosed embodiments.
Figure 2:
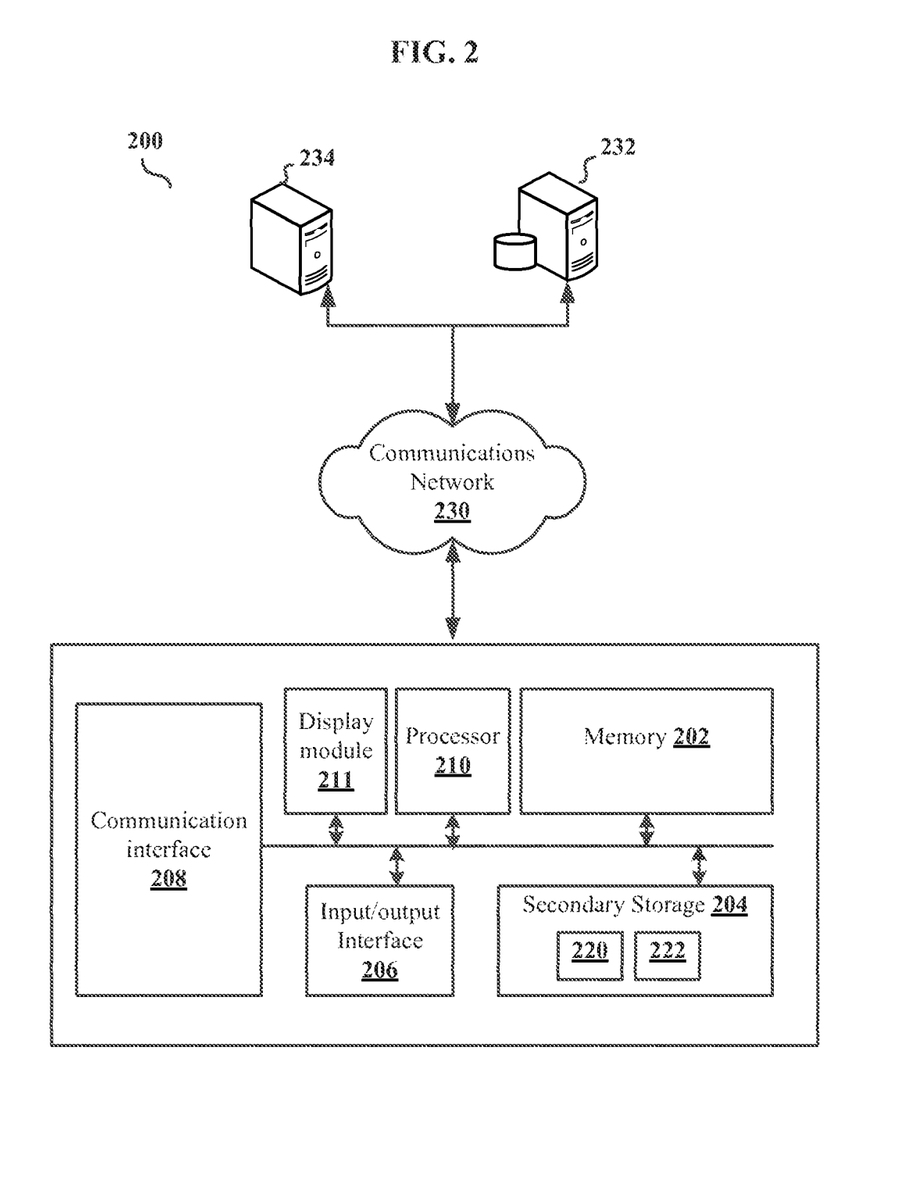
FIG. 2 is a block diagram illustrating one embodiment of a system for implementing the disclosed embodiments.

The disclosed embodiments and additional advantages thereof are best understood by referring to FIGS. 1-2 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and are not intended to assert or imply any limitation with regard to the environment, architecture, design, or process in which different embodiments may be implemented.

Beginning with FIG. 1, an example of a computer implemented method (process 100) for generating facies definition using an unsupervised classification procedure in accordance with the disclosed embodiments is presented. The process 100 begins at step 102 by importing and/or receiving well logging data indicative of one or more properties of geologic formations penetrated by one or more wellbores.

In accordance with the disclosed embodiments, the well logging data may be gathered during drilling of a wellbore using tools that are delivered downhole via wireline or alternatively using tools that are coupled to or integrated into a drill string of a drilling rig. For example, in certain embodiments, wireline-delivered tools are suspended from a wireline that is electrically connected to control and logging equipment at the surface of the well. The tools may be deployed by first removing the drill string and then lowering the wireline and tools to an area of interest within the formation. This type of testing and measurement is often referred to as "wireline formation testing (WFT)." The tools associated with WFT may be used to measure parameters of the wellbore including pressure and temperature of a formation and wellbore fluids.

In certain embodiments, instead of wireline deployment, measurement tools are coupled to or integrated with the drill string. In these situations, the added expense and time of removing the drill string prior to measurement of important formation properties is avoided. This process of "measurement while drilling (MWD)" uses measurement tools to determine formation and wellbore parameters including, but not limited to, temperature and pressure, as well as the trajectory and location of the drill bit. Additionally, the process of "logging while drilling (LWD)" uses tools to determine additional formation properties such as permeability, porosity, resistivity, and other properties.

Non-limiting examples of the types of well logging data may include electrical logs such as, but not limited to, resistivity logs, image logs, porosity logs, density logs, neutron porosity logs, and sonic logs. Resistivity logging works by characterizing the rock or sediment in a borehole by measuring its electrical resistivity. Image logs use a rotating transducer to measure acoustic impedance across the entire borehole wall. This can then be used to identify the presence and direction of rock fractures, as well as understanding the dip direction of the stratigraphy. Porosity logs measure the fraction or percentage of pore volume in a volume of rock. The density log measures the bulk density of a formation by bombarding it with a radioactive source and measuring the resulting gamma ray count after the effects of Compton Scattering and Photoelectric absorption. The neutron porosity log works by bombarding a formation with high energy epithermal neutrons that lose energy through elastic scattering to near thermal levels before being absorbed by the nuclei of the formation atoms. Sonic logs provide formation interval transit time for shear and compressional waves, which typically vary with lithology and rock texture.

In certain embodiments, the types of well logging data may also include lithology logs such as, but not limited to, gamma ray logs and spontaneous potential logs. Gamma ray logs record the natural radioactivity of the formation along the borehole measured in API. This information is particularly useful for distinguishing between sands and shales in a siliclastic environment. Spontaneous potential logs measure the natural or spontaneous potential difference, without any applied current, between the borehole and the surface. Spontaneous potential logs are commonly used to detect permeable beds and to estimate clay content and formation water salinity.

As stated above, problems with current procedures for performing electrofacies are prone to error because initial assumptions of the properties of data that are often incorrect are being applied to the data. Such assumptions include, but are not limited to, applying a numerical range and/or applying a certain statistical distribution that governs the range of numerical data. Thus, in accordance with the disclosed embodiments, no assumptions are being introduced to the data.

Using the received data, the process then receives a selection of a type well at step 104. The type well will be used as the standard/model for that area in which everything else will be compared. Selection of the type well is based on the quality or maximum coverage of the section of interest. For instance, in one embodiment, selection of the type well is based on an analysis of stratigraphic intervals. From this analysis, the type well is selected to have the best expression of that stratigraphy (i.e., the well data that has most complete example of the unit/stratigraphy in the section of interest). In certain embodiments, the type well will also include ancillary data such as, but not limited to, core and special core analysis.

In an alternative embodiment, the type well may be created from the data that comprise several wells. For example, in one embodiment, the type well may be made from a composite of the well data, where one or more components of the data may be averaged or an expected value established.

At step 106, the process develops an appropriate scaling of the data based on the type well so that all the logs/data are comparable to one another as each of the log data is numerically different. For example, resistivity is measured on a logarithmic scale and can vary from 2/10 to 20,000, whereas sonic logs have a range of 40-240, and porosity logs have values between 0-1. Thus, each of the different types of log data has a different number system. In one embodiment, the process will scale each of the log data to a predetermined, non-dimensional scale (e.g., a 0-1 scale). How to scale data is determined by a thorough examination of type well data using tools embodied in exploratory data analysis (EDA). By scaling all the data in this fashion, no assumptions have been made regarding distributional properties of the data and each log is weighted equally with all the others. In addition, the scaling process preserves the shape of each log and produces no adverse effect.

The process then at step 108 creates a training set by drawing samples without replacement from the type well data at random depths. A reason for creating the training set is that the full set of data would be too computationally inefficient for any algorithm to process. For instance, most logs provide a reading every six inches. Thus, a single log for a well that is 3,000 feet deep will have 6,000 readings. Therefore, when multiplied by a plurality of logs, the full set of data would be too much to computationally process efficiently. As a non-limiting example, in one embodiment, the process may sample 600-800 log readings at randomly selected depths for creating the training set.

At step 110, the process analyzes and modifies the training set to remove data with properties that may interfere with the classification process disclosed herein. For instance, in one embodiment, the process will remove invariant data. For example, a caliper log, which provides a continuous measurement of the size and shape of a borehole along its depth, is basically invariant (i.e., the measurements do not vary much) if the borehole is in good condition. Thus, in one embodiment, the disclosed process would remove this type of log data in the training set because it tends to make all the observations look very similar. Any classification procedure highlights differences.

In addition, in one embodiment, the process will remove any redundant data from the training set. For example, redundant data may occur when there are multiple logs that measure the same thing. As an example, often data will include an environmental corrected gamma ray log, a gamma ray log, and a normalized gamma ray log that are all almost hundred percent correlated. Thus, if the training set data includes all three of these logs, the classification process would be improperly weighted to the gamma ray end. Thus, in one embodiment, the process will select or receive a selection of just one of these gamma ray logs. For instance, in one embodiment, the selection may be based on an analysis of a statistical profile of the logs. In one embodiment, the log data that is not selected to be in the training set is not discarded, but instead merely not included in this particular stage of the analysis.

The process, at step 112, then classifies the training set samples by applying an unsupervised classification procedure to the training set. As a non-limiting example, in one embodiment, the process applies an unweighted pair group method with arithmetic mean (UPGMA) analysis for classifying the training set samples on the basis of their pairwise similarities in relevant descriptor variables. Other types of unsupervised classification procedures may also be employed in accordance with the disclosed embodiments.

In one embodiment, following the unsupervised classification procedure, the process generates a diagram that illustrates the hierarchy of relationships among the training samples at all similarity levels. Information carried by each hierarchical level is evaluated. The process then selects, or in some embodiments, receives a user-selection, of a level that appears to best exemplify a usable grouping. In one embodiment, this step is performed based on geometrical and/or graphical analysis of the relationship of the training samples to identify the groups.

At step 114, the process tests the lithofacies. For instance, in one embodiment, the process establishes statistical differentiation of the groups to interpret the groups in terms of the logs to determine how they differ. For example, in one embodiment, the process may use a multivariate analysis of variance (MANOVA) for comparing multivariate means and other statistics of the derived groups. Other embodiments may apply a stepwise linear discriminant analysis (LDA) to find a linear combination of features which characterizes or separate the established groups. The grouping obtained from the clustering procedure is evaluated by these methods. The disclosed embodiments may employ other numerical or graphical analysis techniques to examine the relationships between variables and groupings for classifying the lithofacies. For instance, in certain embodiments, the process may generate or employ one or more boxplots, star diagrams, scatterplots, statistical profiles, and polar ordination to examine the relationships between variables and groups comprising the lithofacies classification.

In one embodiment, at step 116, once an acceptable classification is obtained, the process develops classification functions. For example, in one embodiment, the process uses another aspect of the linear discriminant procedure (LDA) to establish linear functions that divide the groups into sets based on the multivariate statistical properties of each group. The process first applies these linear functions to the type well and results are compared to other geological data. The process then is configured to utilize the groups derived from application of clustering methods to the training set to the classify the to classify the lithofacies of the entire section of interest in the type well, of which the training set is a sample, using the classification functions established from the classified training set.

The process may rely on the classification functions developed using the training set or if necessary, refine the classification and the process develops new classification functions based on the entire set of type well data.

At step 118, the process then uses the classification functions to classify unknown wells that have the same log suite. These data can then be used to populate an earth model to predict the rock types for drilling a new well. The process thus produces a 3 dimensional realization of the distribution of log-defined rock types.

Accordingly, the disclosed embodiments provide a novel and efficient procedure to generate facies definition using unsupervised classification procedures. Several aspects of the described embodiments differ significantly from electrofacies procedures currently in use. For example, difference between the disclosed embodiments and prior procedures lie in the application and type of scaling used on the raw log data, and in the use of scaled raw log data as opposed to computed values obtained from a petrophysical model. The scaling procedure is non-parametric, thereby reducing dependence on assumptions of distributional parameters.

In addition, the disclosed embodiments described above uses a purely unsupervised procedure to develop the initial partition of the scaled raw log data. Input of an a priori number of groups or any other information is unnecessary.

Experimental application of the disclosed embodiments in several different areas has resulted in mapped geological patterns that are more applicable to current earth modeling techniques. For example, the disclosed embodiments provide better volumetric estimates and can better define "sweet spots" and help to predict the well performance. Because rock properties are defined by logs calibrated to laboratory data, these properties can be propagated in an earth model using the group statistics.

As an example, the disclosed embodiments have been applied to exploration problems in several different areas and have achieved remarkable success. In one example, a client reported a 50% increase in the performance of four wells drilled using the disclosed embodiments to develop input to an earth model which in turn was used to select drilling locations. The disclosed embodiments can help completions engineers decide where and how to drill lateral wells and how to complete them. These disclosed embodiments are also of value in defining the extent of resource plays based on log characteristics.

Referring now to FIG. 2, a block diagram illustrating one embodiment of a system 200 for implementing the features and functions of the disclosed embodiments is presented. The system 200 may be any type of computing device including, but not limited to, a desktop computer, a laptop, a server, a tablet, and a mobile device. The system 200 includes, among other components, a processor 210, main memory 202, secondary storage unit 204, an input/output interface module 206, and a communication interface module 208.

The processor 210 may be any type or any number of single core or multi-core processors capable of executing instructions for performing the features and functions of the disclosed embodiments. The input/output interface module 206 enables the system 200 to receive user input (e.g., from a keyboard and mouse) and output information to one or more devices such as, but not limited to, printers, external data storage devices, and audio speakers. The system 200 may optionally include a separate display module 211 to enable information to be displayed on an integrated or external display device. For instance, the display module 211 may include instructions or hardware (e.g., a graphics card or chip) for providing enhanced graphics, touchscreen, and/or multi-touch functionalities associated with one or more display devices.

Main memory 202 is volatile memory that stores currently executing instructions/data or instructions/data that are prefetched for execution. The secondary storage unit 204 is non-volatile memory for storing persistent data. The secondary storage unit 204 may be or include any type of data storage component such as a hard drive, a flash drive, or a memory card. In one embodiment, the secondary storage unit 204 stores the computer executable code/instructions and other relevant data for enabling a user to perform the features and functions of the disclosed embodiments.

For example, in accordance with the disclosed embodiments, the secondary storage unit 204 may permanently store executable code/instructions 220 for performing the above-described procedure for generating facies definition using an unsupervised classification procedure. The executable code/instructions 220 are then loaded from the secondary storage unit 204 to main memory 202 during execution by the processor 210 for performing the disclosed embodiments. In addition, the secondary storage unit 204 may store other executable code/instructions and data 222 such as, but not limited to, a reservoir simulation application (e.g., Nexus® reservoir simulation software) for use with the disclosed embodiments.

The communication interface module 208 enables the system 200 to communicate with the communications network 230. For example, the network interface module 208 may include a network interface card and/or a wireless transceiver for enabling the system 200 to send and receive data through the communications network 230 and/or directly with other devices.

The communications network 230 may be any type of network including a combination of one or more of the following networks: a wide area network, a local area network, one or more private networks, the Internet, a telephone network such as the public switched telephone network (PSTN), one or more cellular networks, and/or wireless data networks. The communications network 230 may include a plurality of network nodes (not depicted) such as routers, network access points/gateways, switches, DNS servers, proxy servers, and other network nodes for assisting in routing of data/communications between devices.

For example, in one embodiment, the system 200 may interact with one or more servers 234 or databases 232 for performing the features of the disclosed embodiments. For instance, the system 200 may query the database 232 for well log information for use in generating facies definition in accordance with the disclosed embodiments. Further, in certain embodiments, the system 200 may act as a server system for one or more client devices or a peer system for peer to peer communications or parallel processing with one or more devices/computing systems (e.g., clusters, grids).

The disclosed embodiments may be integrated in an Earth model application such as, but not limited to, DecisionSpace® Earth Modeling, or may be implemented in a stand-alone software application or module. DecisionSpace® Earth Modeling software is available from Landmark Graphics Corporation.

While specific details about the above embodiments have been described, the above hardware and software descriptions are intended merely as example embodiments and are not intended to limit the structure or implementation of the disclosed embodiments. For instance, although many other internal components of the system 200 are not shown, those of ordinary skill in the art will appreciate that such components and their interconnection are well known.

In addition, certain aspects of the disclosed embodiments, as outlined above, may be embodied in software that is executed using one or more processing units/components. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives, optical or magnetic disks, and the like, which may provide storage at any time for the software programming.

Additionally, the flowchart and block diagrams in the figures illustrate the architecture, functionality, and operation of possible implementations of systems, methods and computer program products according to various embodiments of the present invention. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the embodiments described above, many examples of specific combinations are within the scope of the disclosure, some of which are detailed below.

Example 1 is a computer-implemented method for generating facies definition. The method comprising receiving well logging data indicative of one or more properties of geologic formations penetrated by one or more wellbores, wherein no assumptions are being introduced to the well logging data; determining a type well; developing an appropriate scaling of the well logging data based on the type well; creating a training set by drawing samples from the well logging data at random depths; modifying the training set to remove interfering data; performing an unsupervised classification procedure on the training set to group samples in the training set; comparing a suite of values of the well logging data in the groups to classify lithofacies of the type well; develop classification functions; and classifying unknown wells using the classification functions to generate the facies definition.

Example 2 is a computer-implemented method for generating facies definition. The method comprising receiving well logging data indicative of one or more properties of geologic formations penetrated by one or more wellbores, wherein no assumptions are being introduced to the well logging data; determining a type well; developing an appropriate scaling of the well logging data based on the type well; creating a training set by drawing samples from the well logging data at random depths; modifying the training set to remove interfering data; performing an unsupervised classification procedure on the training set to group samples in the training set; comparing a suite of values of the well logging data in the groups to classify lithofacies of the type well; develop classification functions; and classifying unknown wells using the classification functions to generate the facies definition, wherein the facies definition is used to populate an earth model.

Example 3 is a computer-implemented method for generating facies definition. The method comprising receiving well logging data indicative of one or more properties of geologic formations penetrated by one or more wellbores, wherein no assumptions are being introduced to the well logging data; determining a type well, wherein the type well has the best expression of a stratigraphy in a section of interest; developing an appropriate scaling of the well logging data based on the type well; creating a training set by drawing samples from the well logging data at random depths; modifying the training set to remove interfering data; performing an unsupervised classification procedure on the training set to group samples in the training set; comparing a suite of values of the well logging data in the groups to classify lithofacies of the type well; develop classification functions; and classifying unknown wells using the classification functions to generate the facies definition.

Example 4 is a computer-implemented method for generating facies definition. The method comprising receiving well logging data indicative of one or more properties of geologic formations penetrated by one or more wellbores, wherein no assumptions are being introduced to the well logging data; determining a type well, wherein the type well is generated from a composite of data from the well logging data; developing an appropriate scaling of the well logging data based on the type well; creating a training set by drawing samples from the well logging data at random depths; modifying the training set to remove interfering data; performing an unsupervised classification procedure on the training set to group samples in the training set; comparing a suite of values of the well logging data in the groups to classify lithofacies of the type well; develop classification functions; and classifying unknown wells using the classification functions to generate the facies definition.

Example 5 is a computer-implemented method for generating facies definition. The method comprising receiving well logging data indicative of one or more properties of geologic formations penetrated by one or more wellbores, wherein no assumptions are being introduced to the well logging data; determining a type well; developing an appropriate scaling of the well logging data based on the type well, wherein the appropriate scaling of the well logging data preserves a shape of the log; creating a training set by drawing samples from the well logging data at random depths; modifying the training set to remove interfering data; performing an unsupervised classification procedure on the training set to group samples in the training set; comparing a suite of values of the well logging data in the groups to classify lithofacies of the type well; develop classification functions; and classifying unknown wells using the classification functions to generate the facies definition.

Example 6 is a computer-implemented method for generating facies definition. The method comprising receiving well logging data indicative of one or more properties of geologic formations penetrated by one or more wellbores, wherein no assumptions are being introduced to the well logging data; determining a type well; developing an appropriate scaling of the well logging data based on the type well; creating a training set by drawing samples from the well logging data at random depths, wherein the training set consist of 600-800 log readings at randomly selected depths; modifying the training set to remove interfering data; performing an unsupervised classification procedure on the training set to group samples in the training set; comparing a suite of values of the well logging data in the groups to classify lithofacies of the type well; develop classification functions; and classifying unknown wells using the classification functions to generate the facies definition.

Example 7 is a computer-implemented method for generating facies definition. The method comprising receiving well logging data indicative of one or more properties of geologic formations penetrated by one or more wellbores, wherein no assumptions are being introduced to the well logging data; determining a type well; developing an appropriate scaling of the well logging data based on the type well; creating a training set by drawing samples from the well logging data at random depths; modifying the training set to remove interfering data including redundant data; performing an unsupervised classification procedure on the training set to group samples in the training set; comparing a suite of values of the well logging data in the groups to classify lithofacies of the type well; develop classification functions; and classifying unknown wells using the classification functions to generate the facies definition.

Example 8 is a computer-implemented method for generating facies definition. The method comprising receiving well logging data indicative of one or more properties of geologic formations penetrated by one or more wellbores, wherein no assumptions are being introduced to the well logging data; determining a type well; developing an appropriate scaling of the well logging data based on the type well; creating a training set by drawing samples from the well logging data at random depths; modifying the training set to remove interfering data including invariant data; performing an unsupervised classification procedure on the training set to group samples in the training set; comparing a suite of values of the well logging data in the groups to classify lithofacies of the type well; develop classification functions; and classifying unknown wells using the classification functions to generate the facies definition.

Example 9 is a computer-implemented method for generating facies definition. The method comprising receiving well logging data indicative of one or more properties of geologic formations penetrated by one or more wellbores, wherein no assumptions are being introduced to the well logging data; determining a type well; developing an appropriate scaling of the well logging data based on the type well; creating a training set by drawing samples from the well logging data at random depths; modifying the training set to remove interfering data; performing an unsupervised classification procedure on the training set to group samples in the training set that includes generating a diagram that illustrates a relationship of the samples in the training set at all levels; comparing a suite of values of the well logging data in the groups to classify lithofacies of the type well; develop classification functions; and classifying unknown wells using the classification functions to generate the facies definition.

Example 10 is a computer-implemented method for generating facies definition. The method comprising receiving well logging data indicative of one or more properties of geologic formations penetrated by one or more wellbores, wherein no assumptions are being introduced to the well logging data; determining a type well; developing an appropriate scaling of the well logging data based on the type well; creating a training set by drawing samples from the well logging data at random depths; modifying the training set to remove interfering data including redundant data and invariant data; performing an unsupervised classification procedure on the training set to group samples in the training set; comparing a suite of values of the well logging data in the groups to classify lithofacies of the type well; develop classification functions; and classifying unknown wells using the classification functions to generate the facies definition.

Example 11 is a system, comprising: at least one processor; and at least one memory coupled to the at least one processor and storing computer executable instructions for generating facies definition. The computer executable instructions comprises instructions for receiving well logging data indicative of one or more properties of geologic formations penetrated by one or more wellbores, wherein no assumptions are being introduced to the well logging data; determining a type well; developing an appropriate scaling of the well logging data based on the type well; creating a training set by drawing samples from the well logging data at random depths; modifying the training set to remove interfering data; performing an unsupervised classification procedure on the training set to group samples in the training set; comparing a suite of values of the well logging data in the groups to classify lithofacies of the type well; develop classification functions; and classifying unknown wells using the classification functions to generate the facies definition.

Example 12 is a system, comprising: at least one processor; and at least one memory coupled to the at least one processor and storing computer executable instructions for generating facies definition. The computer executable instructions comprises instructions for receiving well logging data indicative of one or more properties of geologic formations penetrated by one or more wellbores, wherein no assumptions are being introduced to the well logging data; determining a type well; developing an appropriate scaling of the well logging data based on the type well; creating a training set by drawing samples from the well logging data at random depths; modifying the training set to remove interfering data; performing an unsupervised classification procedure on the training set to group samples in the training set; comparing a suite of values of the well logging data in the groups to classify lithofacies of the type well; develop classification functions; and classifying unknown wells using the classification functions to generate the facies definition, wherein the facies definition is used to populate an earth model.

Example 13 is a system, comprising: at least one processor; and at least one memory coupled to the at least one processor and storing computer executable instructions for generating facies definition. The computer executable instructions comprises instructions for receiving well logging data indicative of one or more properties of geologic formations penetrated by one or more wellbores, wherein no assumptions are being introduced to the well logging data; determining a type well, wherein the type well has the best expression of a stratigraphy in a section of interest; developing an appropriate scaling of the well logging data based on the type well; creating a training set by drawing samples from the well logging data at random depths; modifying the training set to remove interfering data; performing an unsupervised classification procedure on the training set to group samples in the training set; comparing a suite of values of the well logging data in the groups to classify lithofacies of the type well; develop classification functions; and classifying unknown wells using the classification functions to generate the facies definition, wherein the facies definition is used to populate an earth model.

Example 14 is a system, comprising: at least one processor; and at least one memory coupled to the at least one processor and storing computer executable instructions for generating facies definition. The computer executable instructions comprises instructions for receiving well logging data indicative of one or more properties of geologic formations penetrated by one or more wellbores, wherein no assumptions are being introduced to the well logging data; determining a type well, wherein the type well is generated from a composite of data from the well logging data; developing an appropriate scaling of the well logging data based on the type well; creating a training set by drawing samples from the well logging data at random depths; modifying the training set to remove interfering data; performing an unsupervised classification procedure on the training set to group samples in the training set; comparing a suite of values of the well logging data in the groups to classify lithofacies of the type well; develop classification functions; and classifying unknown wells using the classification functions to generate the facies definition, wherein the facies definition is used to populate an earth model.

Example 15 is a system, comprising: at least one processor; and at least one memory coupled to the at least one processor and storing computer executable instructions for generating facies definition. The computer executable instructions comprises instructions for receiving well logging data indicative of one or more properties of geologic formations penetrated by one or more wellbores, wherein no assumptions are being introduced to the well logging data; determining a type well, wherein the type well has the best expression of a stratigraphy in a section of interest; developing an appropriate scaling of the well logging data based on the type well, wherein the appropriate scaling of the well logging data preserves a shape of the log; creating a training set by drawing samples from the well logging data at random depths; modifying the training set to remove interfering data; performing an unsupervised classification procedure on the training set to group samples in the training set; comparing a suite of values of the well logging data in the groups to classify lithofacies of the type well; develop classification functions; and classifying unknown wells using the classification functions to generate the facies definition, wherein the facies definition is used to populate an earth model.

Example 16 is a system, comprising: at least one processor; and at least one memory coupled to the at least one processor and storing computer executable instructions for generating facies definition. The computer executable instructions comprises instructions for receiving well logging data indicative of one or more properties of geologic formations penetrated by one or more wellbores, wherein no assumptions are being introduced to the well logging data; determining a type well, wherein the type well has the best expression of a stratigraphy in a section of interest; developing an appropriate scaling of the well logging data based on the type well, wherein the appropriate scaling of the well logging data preserves a shape of the log; creating a training set by drawing samples from the well logging data at random depths, wherein the training set consist of 600-800 log readings at randomly selected depths; modifying the training set to remove interfering data; performing an unsupervised classification procedure on the training set to group samples in the training set; comparing a suite of values of the well logging data in the groups to classify lithofacies of the type well; develop classification functions; and classifying unknown wells using the classification functions to generate the facies definition, wherein the facies definition is used to populate an earth model.

Example 17 is a system, comprising: at least one processor; and at least one memory coupled to the at least one processor and storing computer executable instructions for generating facies definition. The computer executable instructions comprises instructions for receiving well logging data indicative of one or more properties of geologic formations penetrated by one or more wellbores, wherein no assumptions are being introduced to the well logging data; determining a type well, wherein the type well has the best expression of a stratigraphy in a section of interest; developing an appropriate scaling of the well logging data based on the type well, wherein the appropriate scaling of the well logging data preserves a shape of the log; creating a training set by drawing samples from the well logging data at random depths; modifying the training set to remove interfering data including redundant data and invariant data; performing an unsupervised classification procedure on the training set to group samples in the training set; comparing a suite of values of the well logging data in the groups to classify lithofacies of the type well; develop classification functions; and classifying unknown wells using the classification functions to generate the facies definition, wherein the facies definition is used to populate an earth model.

Example 18 is a system, comprising: at least one processor; and at least one memory coupled to the at least one processor and storing computer executable instructions for generating facies definition. The computer executable instructions comprises instructions for receiving well logging data indicative of one or more properties of geologic formations penetrated by one or more wellbores, wherein no assumptions are being introduced to the well logging data; determining a type well, wherein the type well has the best expression of a stratigraphy in a section of interest; developing an appropriate scaling of the well logging data based on the type well, wherein the appropriate scaling of the well logging data preserves a shape of the log; creating a training set by drawing samples from the well logging data at random depths; modifying the training set to remove interfering data including redundant data and invariant data; performing an unsupervised classification procedure on the training set to group samples in the training set that includes generating a diagram that illustrates a relationship of the samples in the training set at all levels; comparing a suite of values of the well logging data in the groups to classify lithofacies of the type well; develop classification functions; and classifying unknown wells using the classification functions to generate the facies definition, wherein the facies definition is used to populate an earth model.

Example 19 is a non-transitory computer readable medium comprising computer executable instructions for generating facies definition. The computer executable instructions when executed further causes the one or more machines to perform operations comprising receiving well logging data indicative of one or more properties of geologic formations penetrated by one or more wellbores, wherein no assumptions are being introduced to the well logging data; determining a type well; developing an appropriate scaling of the well logging data based on the type well; creating a training set by drawing samples from the well logging data at random depths; modifying the training set to remove interfering data; performing an unsupervised classification procedure on the training set to group samples in the training set; comparing a suite of values of the well logging data in the groups to classify lithofacies of the type well; develop classification functions; and classifying unknown wells using the classification functions to generate the facies definition.

Example 20 is a non-transitory computer readable medium comprising computer executable instructions for generating facies definition. The computer executable instructions when executed further causes the one or more machines to perform operations comprising receiving well logging data indicative of one or more properties of geologic formations penetrated by one or more wellbores, wherein no assumptions are being introduced to the well logging data; determining a type well; developing an appropriate scaling of the well logging data based on the type well; creating a training set by drawing samples from the well logging data at random depths; modifying the training set to remove interfering data; performing an unsupervised classification procedure on the training set to group samples in the training set; comparing a suite of values of the well logging data in the groups to classify lithofacies of the type well; develop classification functions; and classifying unknown wells using the classification functions to generate the facies definition, wherein the facies definition is used to populate an earth model.

Example 21 is a non-transitory computer readable medium comprising computer executable instructions for generating facies definition. The computer executable instructions when executed further causes the one or more machines to perform operations comprising receiving well logging data indicative of one or more properties of geologic formations penetrated by one or more wellbores, wherein no assumptions are being introduced to the well logging data; determining a type well, wherein the type well has the best expression of a stratigraphy in a section of interest; developing an appropriate scaling of the well logging data based on the type well; creating a training set by drawing samples from the well logging data at random depths; modifying the training set to remove interfering data; performing an unsupervised classification procedure on the training set to group samples in the training set; comparing a suite of values of the well logging data in the groups to classify lithofacies of the type well; develop classification functions; and classifying unknown wells using the classification functions to generate the facies definition, wherein the facies definition is used to populate an earth model.

Example 22 is a non-transitory computer readable medium comprising computer executable instructions for generating facies definition. The computer executable instructions when executed further causes the one or more machines to perform operations comprising receiving well logging data indicative of one or more properties of geologic formations penetrated by one or more wellbores, wherein no assumptions are being introduced to the well logging data; determining a type well, wherein the type well is generated from a composite of data from the well logging data; developing an appropriate scaling of the well logging data based on the type well; creating a training set by drawing samples from the well logging data at random depths; modifying the training set to remove interfering data; performing an unsupervised classification procedure on the training set to group samples in the training set; comparing a suite of values of the well logging data in the groups to classify lithofacies of the type well; develop classification functions; and classifying unknown wells using the classification functions to generate the facies definition, wherein the facies definition is used to populate an earth model.

Example 23 is a non-transitory computer readable medium comprising computer executable instructions for generating facies definition. The computer executable instructions when executed further causes the one or more machines to perform operations comprising receiving well logging data indicative of one or more properties of geologic formations penetrated by one or more wellbores, wherein no assumptions are being introduced to the well logging data; determining a type well, wherein the type well has the best expression of a stratigraphy in a section of interest; developing an appropriate scaling of the well logging data based on the type well, wherein the appropriate scaling of the well logging data preserves a shape of the log; creating a training set by drawing samples from the well logging data at random depths; modifying the training set to remove interfering data; performing an unsupervised classification procedure on the training set to group samples in the training set; comparing a suite of values of the well logging data in the groups to classify lithofacies of the type well; develop classification functions; and classifying unknown wells using the classification functions to generate the facies definition, wherein the facies definition is used to populate an earth model.

Example 24 is a non-transitory computer readable medium comprising computer executable instructions for generating facies definition. The computer executable instructions when executed further causes the one or more machines to perform operations comprising receiving well logging data indicative of one or more properties of geologic formations penetrated by one or more wellbores, wherein no assumptions are being introduced to the well logging data; determining a type well, wherein the type well has the best expression of a stratigraphy in a section of interest; developing an appropriate scaling of the well logging data based on the type well, wherein the appropriate scaling of the well logging data preserves a shape of the log; creating a training set by drawing samples from the well logging data at random depths, wherein the training set consist of 600-800 log readings at randomly selected depths; modifying the training set to remove interfering data; performing an unsupervised classification procedure on the training set to group samples in the training set; comparing a suite of values of the well logging data in the groups to classify lithofacies of the type well; develop classification functions; and classifying unknown wells using the classification functions to generate the facies definition, wherein the facies definition is used to populate an earth model.

Example 25 is a non-transitory computer readable medium comprising computer executable instructions for generating facies definition. The computer executable instructions when executed further causes the one or more machines to perform operations comprising receiving well logging data indicative of one or more properties of geologic formations penetrated by one or more wellbores, wherein no assumptions are being introduced to the well logging data; determining a type well, wherein the type well has the best expression of a stratigraphy in a section of interest; developing an appropriate scaling of the well logging data based on the type well, wherein the appropriate scaling of the well logging data preserves a shape of the log; creating a training set by drawing samples from the well logging data at random depths; modifying the training set to remove interfering data including redundant data and invariant data; performing an unsupervised classification procedure on the training set to group samples in the training set; comparing a suite of values of the well logging data in the groups to classify lithofacies of the type well; develop classification functions; and classifying unknown wells using the classification functions to generate the facies definition, wherein the facies definition is used to populate an earth model.

Example 26 is a non-transitory computer readable medium comprising computer executable instructions for generating facies definition. The computer executable instructions when executed further causes the one or more machines to perform operations comprising receiving well logging data indicative of one or more properties of geologic formations penetrated by one or more wellbores, wherein no assumptions are being introduced to the well logging data; determining a type well, wherein the type well has the best expression of a stratigraphy in a section of interest; developing an appropriate scaling of the well logging data based on the type well, wherein the appropriate scaling of the well logging data preserves a shape of the log; creating a training set by drawing samples from the well logging data at random depths; modifying the training set to remove interfering data including redundant data and invariant data; performing an unsupervised classification procedure on the training set to group samples in the training set that includes generating a diagram that illustrates a relationship of the samples in the training set at all levels; comparing a suite of values of the well logging data in the groups to classify lithofacies of the type well; develop classification functions; and classifying unknown wells using the classification functions to generate the facies definition, wherein the facies definition is used to populate an earth model.

The above specific example embodiments are not intended to limit the scope of the claims. The example embodiments may be modified by including, excluding, or combining one or more features or functions described in the disclosure.

The invention claimed is:

1. A computer-implemented method for generating a facies definition, the method comprising:
   receiving well logging data indicative of one or more properties of geologic formations penetrated by one or more wellbores, wherein no assumptions are being introduced to the well logging data;
   determining a type well;
   developing an appropriate scaling of the well logging data based on the type well;
   creating a training set by drawing samples from the well logging data at random depths;
   modifying the training set to remove interfering data;
   performing an unsupervised classification procedure on the training set to group samples in the training set;
   comparing a suite of values of the well logging data in the groups to classify lithofacies of the type well;
   developing classification functions;
   classifying unknown wells using the classification functions to generate the facies definition;
   populating an earth model of the geological formations using the facies definition;
   determining a distribution of rock types within the geologic formations, based on the populated earth model;
   selecting a location for a new wellbore to be drilled within the geologic formations, based on the distribution of rock types; and
   drilling the new wellbore at the selected location within the geological formations.

2. The computer-implemented method of claim 1, wherein the type well has the best expression of a stratigraphy in a section of interest.

3. The computer-implemented method of claim 1, wherein the type well is generated from a composite of data from the well logging data.

4. The computer-implemented method of claim 1, wherein the appropriate scaling of the well logging data preserves a shape of the log.

5. The computer-implemented method of claim 1, wherein the training set consist of 600-800 log readings at randomly selected depths.

6. The computer-implemented method of claim 1, wherein modifying the training set to remove interfering data includes removing redundant data.

7. The computer-implemented method of claim 1, wherein modifying the training set to remove interfering data includes removing invariant data.

8. The computer-implemented method of claim 1, further comprising generating a diagram that illustrates a relationship of the samples in the training set at all levels.

9. A system, comprising:
   at least one processor; and
   at least one memory coupled to the at least one processor and storing computer executable instructions for generating a facies definition, the computer executable instructions comprises instructions for:
   receiving well logging data indicative of one or more properties of geologic formations penetrated by one or more wellbores, wherein no assumptions are being introduced to the well logging data;
   determining a type well;
   developing an appropriate scaling of the well logging data based on the type well;

creating a training set by drawing samples from the well logging data at random depths;
modifying the training set to remove interfering data;
performing an unsupervised classification procedure on the training set to group samples in the training set;
comparing a suite of values of the well logging data in the groups to classify lithofacies of the type well;
developing classification functions;
classifying unknown wells using the classification functions to generate the facies definition;
populating an earth model of the geological formations using the facies definition;
determining a distribution of rock types within the geologic formations, based on the populated earth model;
selecting a location for a new wellbore to be drilled within the geologic formations, based on the distribution of rock types; and
drilling the new wellbore at the selected location within the geological formations.

10. The system of claim 9, wherein the type well has the best expression of a stratigraphy in a section of interest.

11. The system of claim 9, wherein the type well is generated from a composite of data from the well logging data.

12. The system of claim 9, wherein the appropriate scaling of the well logging data preserves a shape of the log.

13. The system of claim 9, wherein the training set consist of 600-800 log readings at randomly selected depths.

14. The system of claim 9, wherein modifying the training set to remove interfering data includes removing redundant data.

15. The system of claim 9, wherein modifying the training set to remove interfering data includes removing invariant data.

16. The system of claim 9, the computer executable instructions further comprises instructions for generating a diagram that illustrates a relationship of the samples in the training set at all levels.

17. A non-transitory computer readable medium comprising computer executable instructions for generating a facies definition, the computer executable instructions when executed causes one or more machines to perform operations comprising:
receiving well logging data indicative of one or more properties of geologic formations penetrated by one or more wellbores, wherein no assumptions are being introduced to the well logging data;
determining a type well;
developing an appropriate scaling of the well logging data based on the type well;
creating a training set by drawing samples from the well logging data at random depths;
modifying the training set to remove interfering data;
performing an unsupervised classification procedure on the training set to group samples in the training set;
comparing a suite of values of the well logging data in the groups to classify lithofacies of the type well;
developing classification functions;
classifying unknown wells using the classification functions to generate the facies definition;
populating an earth model of the geological formations using the facies definition;
determining a distribution of rock types within the geologic formations, based on the populated earth model;
selecting a location for a new wellbore to be drilled within the geologic formations, based on the distribution of rock types; and
drilling the new wellbore at the selected location within the geological formations.

18. The non-transitory computer readable medium of claim 17, wherein the computer executable instructions when executed further causes the one or more machines to perform operations comprising generating a diagram that illustrates a relationship of the samples in the training set at all levels.

* * * * *